(12) United States Patent
Allison et al.

(10) Patent No.: US 7,133,931 B1
(45) Date of Patent: Nov. 7, 2006

(54) METHOD AND SYSTEM FOR MAKING A FRAME ALTERATION IN A NETWORK PROCESSING SYSTEM

(75) Inventors: Samuel Steven Allison, Fuquay-Varina, NC (US); Brian Mitchell Bass, Apex, NC (US); Jean Louis Calvignac, Cary, NC (US); Anthony Matteo Gallo, Apex, NC (US); Marco C. Heddes, Raleigh, NC (US); Michael Steven Siegel, Raleigh, NC (US); Fabrice Jean Verplanken, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 09/479,026

(22) Filed: Jan. 7, 2000

(51) Int. Cl.
   G06F 15/16 (2006.01)
   G06F 15/167 (2006.01)
   H04B 7/216 (2006.01)
   H04L 12/28 (2006.01)

(52) U.S. Cl. ............... 709/246; 709/214; 709/236; 370/335; 370/395

(58) Field of Classification Search ............... 709/204, 709/214, 240, 246, 250; 375/112; 395/800; 370/85.5, 335, 395; 710/30
   See application file for complete search history.

(56) References Cited

U.S. PATENT DOCUMENTS

| | | | |
|---|---|---|---|
| 4,989,135 A * | 1/1991 | Miki ......................... 364/200 |
| 5,121,396 A * | 6/1992 | Irvin et al. .................. 714/807 |
| 5,146,477 A * | 9/1992 | Cantoni et al. ............. 375/112 |
| 5,448,564 A | 9/1995 | Thor ......................... 370/94.1 |
| 5,495,426 A | 2/1996 | Waclawsky et al. ..... 364/514 C |
| 5,537,413 A * | 7/1996 | Yang et al. ................... 370/85 |
| 5,546,398 A | 8/1996 | Tucker et al. .............. 370/94.1 |
| 5,625,836 A * | 4/1997 | Barker et al. ............... 709/214 |
| 5,805,808 A | 9/1998 | Hasani et al. ............ 395/200.2 |
| 5,909,682 A | 6/1999 | Cowan et al. ................. 707/9 |
| 5,920,562 A | 7/1999 | Christie et al. ............. 370/395 |
| 6,094,686 A * | 7/2000 | Sharma ...................... 709/240 |
| 6,167,466 A * | 12/2000 | Nguyen et al. ............... 710/30 |
| 6,175,654 B1 * | 1/2001 | McVeigh .................... 382/236 |
| 6,404,752 B1 * | 6/2002 | Allen et al. ................. 370/335 |

* cited by examiner

*Primary Examiner*—William Bashore
*Assistant Examiner*—Chau Nguyen
(74) *Attorney, Agent, or Firm*—Joscelyn G. Cockburn (57) ABSTRACT

A system and method of altering frames being processed by a network processing unit. The system includes a set of defined alterations, with some of the alterations being fixed alterations which are advantageously handled by hardware to accomplish the fixed alterations rapidly and without executing a stored program and other alterations which include a variable portion, with these variable alterations being accomplished through the use of stored programs allowing the variables to be used to effect variable alterations to a frame. The present system accommodates a change in the duration of life of a frame or information unit and addition or deletion of bits and also allows for a new cyclic redundancy checking to be accomplished for a revised information unit. Advantageously, the frame alteration system is on the same substrate as the processors.

11 Claims, 6 Drawing Sheets

| 01 | 0B | 15 | 1F | 29 | 33 |
| 02 | 0C | 16 | 20 | 2A | 34 |
| 03 | 0D | 17 | 21 | 2B | 35 |
| 04 | 0E | 18 | 22 | 2C | 36 |
| 05 | 0F | 19 | 23 | 2D | 37 |
| 06 | 10 | 1A | 24 | 2E | 38 |
| 07 | 11 | 1B | 25 | 2F | 39 |
| 08 | 12 | 1C | 26 | 30 | 3A |
| 09 | 13 | 1D | 27 | 31 | 3B |
| 0A | 14 | 1E | 28 | 32 | 3C |

FIG. 5

| B4 | 18 | 20 | 2A | A7 |    |
|----|----|----|----|----|----|
| B3 | 17 | A2 | 29 | A6 | 3C |
| B2 | 16 | A1 | 28 | A5 | 3B |
| B1 | 15 | 1F | 27 | A4 | 3A |
| D6 | 14 | 1E | 26 | A3 | 39 |
| D5 | 13 | 1D | 25 | 2F | 38 |
| D4 | 12 | 1C | 24 | 2E | 37 |
| D3 | 11 | 1B | 23 | 2D | AA |
| D2 | B6 | 1A | 22 | 2C | A9 |
| D1 | B5 | 19 | 21 | 2B | A8 |

METHOD AND SYSTEM FOR MAKING A FRAME ALTERATION IN A NETWORK PROCESSING SYSTEM

CROSS REFERENCE TO RELATED PATENTS

The present invention is related to the following documents which are hereby specifically incorporated herein by reference:

Pending U.S. patent application Ser. No. 09/330,968 entitled "High Speed Parallel/Serial Link for Data Communications" filed Jun. 11, 1999 and assigned to the assignee of the present invention. This patent is sometimes referred to herein as the Link patent.

Pending U.S. patent application Ser. No. 09/384,691 entitled "Network Processor Processing Complex and Methods" filed by Brian Bass et al. on Aug. 27, 1999 and assigned to the assignee of the present invention. In this document, this patent is sometimes referred to as the Network Processing Unit patent (or the NPU patent).

BACKGROUND OF THE INVENTION

1. Field of the Invention

The present invention is an improved system and method for making a frame alteration in a network processing environment. More particularly, the present invention employs fixed hardware alterations as well as flexible software alterations in the environment of a processing system coupled to a network to alter frames at the speed of transmission (media speed).

2. Background Art

Networks are carrying more and more communications, especially with the increase in importance of the Internet and intranets. Some of this information is in the form of digital data, other is in the form of voice information which has been converted into information packets. Whether the information is data or voice, however, it is formed into packets or frames of an appropriate size, then addressed to the destination and sent over a network which includes a plurality of switches or routers to get from the source to the destination. As the amount of information flowing over networks increases, so does the need for equipment to efficiently handle such information as ever increasing speeds and with greater efficiency.

Such frames typically includes the information (voice or data) along with appropriate routing and protocol information, encapsulated into one or more headers to provide the necessary information to direct the frame to the correct receiving location (the destination address) in the proper format and allow it to be received and decoded at the receiving location. Along the way, it may be necessary for the frame may change formats and encapsulated headers may be added to or deleted from the frame through the use of frame alterations.

Various systems are known for processing frames in a network environment. Some of the known systems merely transmit the frames as received to a processor which then adapts the frames to the protocol for the receiving apparatus. Some involve using hardware to remove or change parts of the frame and others involve software or programming to make changes to the frame. While changes to a frame through the use of hardware generally can occur more quickly because they involve only a few gates and minimal delays, such hardware alterations to a frame generally lack flexibility to make a variable change. On the other hand, using a programmed set of instructions to make changes to a frame allows an alteration to be made in a variable manner but usually at a significantly slower speed, since changes using a programmed set of instructions may involve executing of many instructions with conditions and branches, which consume many cycles of the clock and occur in an amount of time which varies according to the number of instructions which are actually executed. Accordingly, software alterations typically operate slowly (not at the speed that the transmission of frames requires), a slowness that would otherwise slow down the entire system.

In a network environment, a variety of frames are passing through a router or switch, with varying origins, destinations and formats. As the speed at which such switches and routers operate increases, it is desirable that the router or switch operate at real time and yet have the capability of providing an alteration to frames which is variable (allowing for change in requirements) while operating quickly.

These systems have limitations and disadvantages that programming a switch or router to remove or alter the frame would require a large amount of programing, requiring either a very high speed processor or a delayed time to respond.

Accordingly, the prior art systems have undesirable disadvantages and limitations in their speed and flexibility—they are either slow and flexible requiring a variable amount of time or fast and inflexible—when a system is needed for making frame alterations that is both fast and flexible.

SUMMARY OF THE INVENTION

The present invention overcomes the disadvantages and limitations of the prior art systems and provide a system and method for transmission of frames in a network environment after making selected frame alterations defined by a control word associated with that frame from a large variety of possible alterations. The frame alterations may occur at high speed, yet providing flexibility to allow multiple alterations to be provided, including both fixed alterations and variable alterations.

The system of the present invention has the advantage that it is simple to operate and allows the system to operate at media speed, that is, the speed at which the frames are presented and being moved toward the network.

Use of the present invention allows certain common alterations to be provided through fixed, hardware routines, which may be operated at a fast speed. Other routines, which are either not as common or which make variable alterations based on an input, are specified in software, allowing the alteration to be done in a variable fashion, with all of the alterations on a frame based on inputs related to the frame which are received with the frame.

The present invention allows a plurality of frame alterations of varying types to be presented in a single set of frame alteration instructions, sometimes referred to as a code word, associated with the frame. The number of such frame alterations is not set to a fixed number of such alterations, but may be specified as desired in an instruction set (in its control word or port control block) associated with a single frame. The instruction set of frame alterations may be unique for a single frame and discarded after use or may be stored and reused for a plurality of frames to which the same frame alterations apply.

Other objects and advantages of the present invention will be apparent to those skilled in the relevant art in view of the following description of the preferred embodiment, taken together with the accompanying drawings and the appended claims.

BRIEF DESCRIPTION OF THE DRAWINGS

Having thus described some of the limitations of the prior art system and some of the advantages and objects of the present invention, other objects and advantages will be apparent to one skilled in the relevant art in view of the following description of the illustrations of the present invention in which:

DETAILED DESCRIPTION OF THE PREFERRED EMBODIMENT

In the following description of the preferred embodiment, the best implementation of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
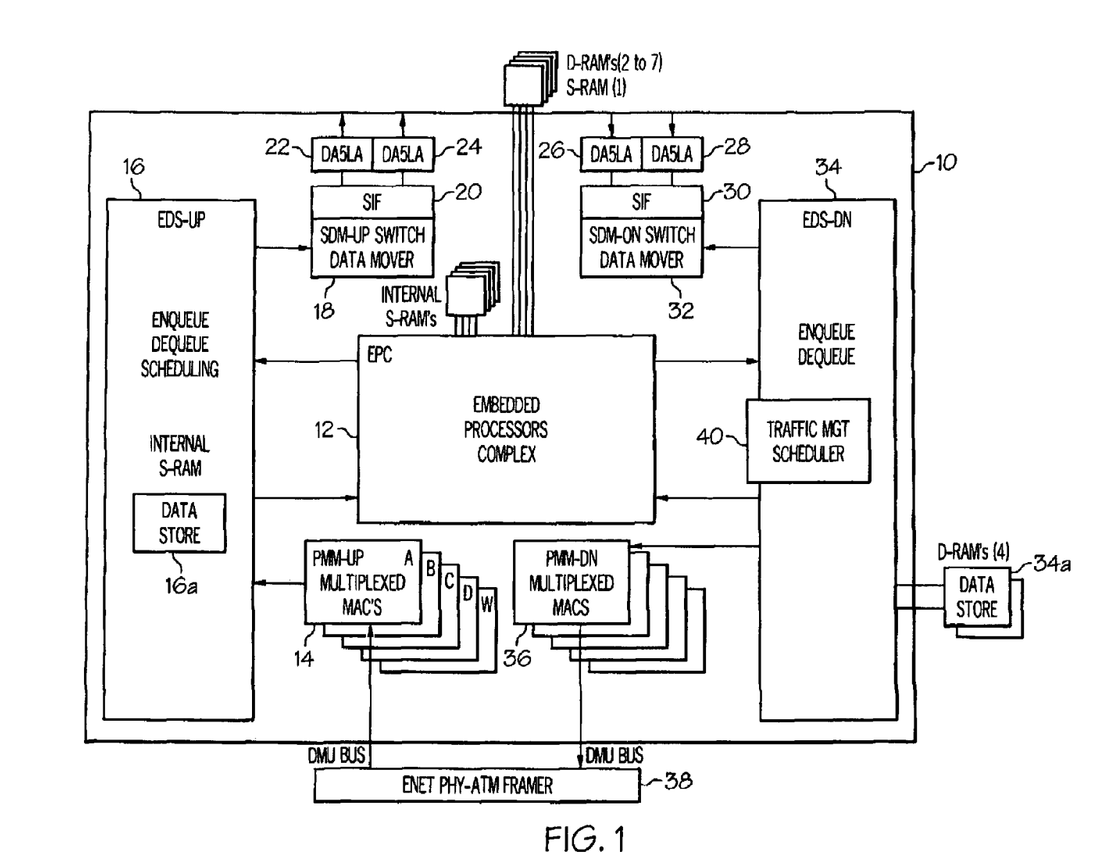
FIG. 1 is a block diagram for an interface device including an embedded processor complex useful in the present invention.

FIG. 1 shows a block diagram of the interface device chip that includes the substrate 10 and a plurality of subassemblies integrated on the substrate. The sub-assemblies are arranged into an upside configuration and a downside configuration, with the "upside" configuration referring to those components relating to data inbound to the chip from a data transmission network (up to or into the chip) and "downside" referring to those components whose function is to transmit data from the chip toward the data transmission network in an outbound fashion (away from the chip or down and into the network). Data flows follow the respective arrangements of the upside and downside configurations; thus, there is a upside data flow and a downside data flow in the system of FIG. 1. The upside configuration includes an Enqueue-Dequeue-Scheduling UP (EDS-UP) logic 16, multiple multiplexed MAC's-UP (PMM-UP) 14, Switch Data Mover-UP (SDM-UP) 18, Switch Interface (SIF) 20, Data Align Serial Link A (DASL-A) 22 and Data Align Serial Link B (DASL-B) 24. Data links are more fully described in the Link patent referenced above, and reference should be made to that document for a greater understanding of this portion of the system. It should be understood that the preferred embodiment of the present invention uses the data links as more fully described in that patent, but other systems can be used to advantage with the present invention, particularly those with relatively high data flows and system requirements, since the present invention is not limited to the particular auxiliary devices such as the data links which are described as the preferred method for implementing the present invention.

The components depicted on the downside (or egress) configuration of the system include DASL-A 26, DASL-B 28, SIF 30, Switch Data Mover SDM-DN 32, data store 34a, Enqueue-Dequeue-Scheduling EDS-DN 34 and PMM-DN Multiplexed MAC'S 36. The substrate 10 also includes a plurality of internal static random access memory components (S-RAM's), a traffic management scheduler (TRAFFIC MGT SCHEDULER) 40 and an embedded processor complex 12 including a plurality of independent processors described in greater depth in the NPU patent referenced above. An interface device 38 is coupled by the respective DMU busses to PMM MAC's 14, 36. The interface device 38 could be any suitable apparatus for connecting to the L1 circuitry, such as Ethernet physical (ENET PHY) devices or asynchronous transfer mode framing equipment (ATM FRAMER), both of which are examples of devices which are well known and generally available for this purpose in the trade. The type and size of the interface device are determined, at least in part, by the network media to which the present chip and its system are attached. A plurality of external dynamic random access memory devices (D-RAMS) and a S-RAM are available for use by the chip.

While here particularly disclosed for networks in which the general data flow outside the relevant switching and routing devices is passed through electric conductors such as wires and cables installed in buildings, the present invention contemplates that the network switches and components thereof could be used in a wireless environment as well. For example, the media access control (MAC) elements herein disclosed may be replaced with suitable radio frequency devices, such as those made from silicon germanium technology, which would result in the connection of the device disclosed directly to a wireless network. Where such technology is appropriately employed, the radio frequency elements can be integrated into the VLSI structures disclosed herein by a person of skill in the appropriate arts. Alternatively, radio frequency or other wireless response devices such as infrared (IR) response devices can be mounted on a blade with the other elements herein disclosed to achieve a switch apparatus which is useful with wireless network apparatus.

The arrows show the general flow of data within the interface system shown in FIG. 1. Frames of data or messages (also sometimes referred to as packets or input information units) received from an Ethernet MAC 14 off the ENET PHY block 38 via the DMU bus are placed in internal data store buffers by the EDS-UP device 16. The frames may be identified as either normal frames or guided frames, which then relates to method and location of the subsequent processing in the plurality of embedded processors in the embedded processor complex 12.

Figure 2:
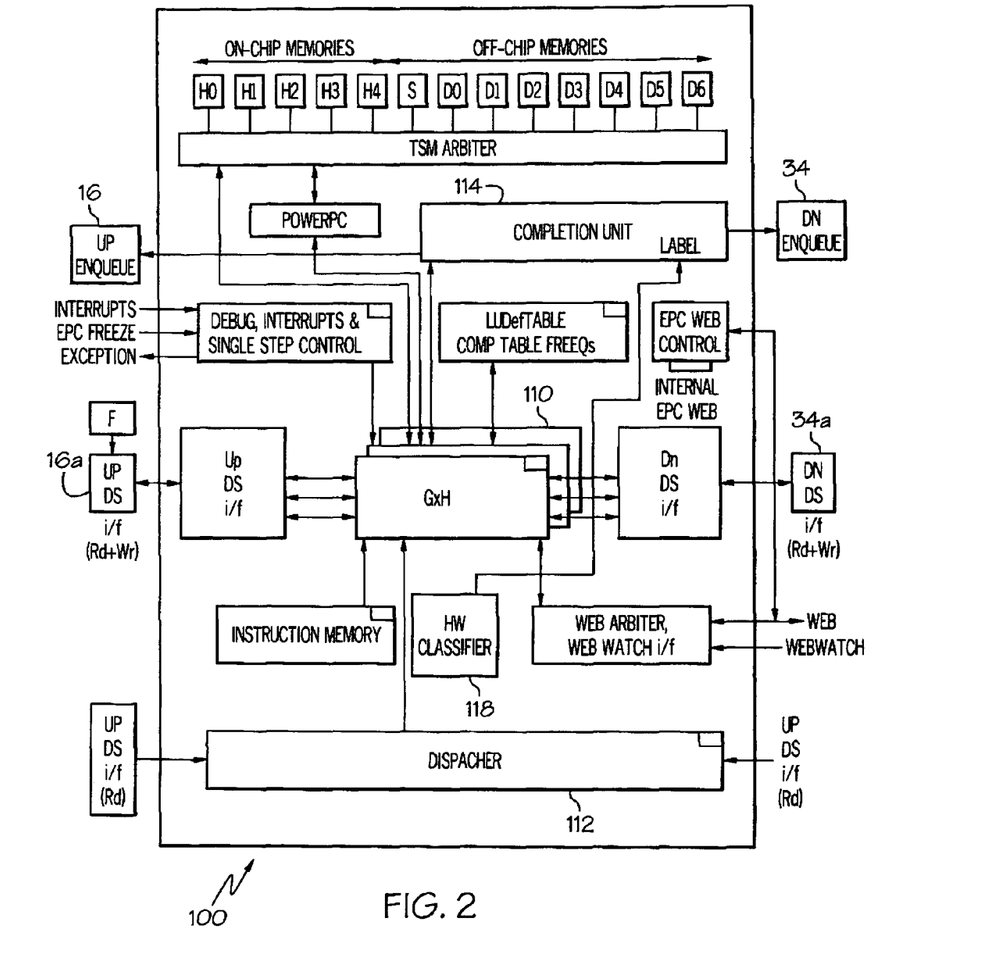
FIG. 2 is a block diagram of the embedded processor complex useful in the present invention.

FIG. 2 is a block diagram of a processing system 100 which can employ the present invention to advantage. In this FIG. 2, a plurality of processing units 110 are located between a dispatcher unit 112 and a completion unit 114. Each incoming frame F (from a network, not shown, attached to the present data processing system) is received and stored into an UP data store 116, then sequentially removed by the dispatcher 112 and assigned to one of the plurality of processing units 110, based on a determination by the dispatcher 112 that the processing unit is available to process the frame. This indication could be that the one processing unit to which the frame F is assigned has sent a signal to the dispatcher 112 indicating that that particular processing unit was idle and available for work, although alternate methods of assigning work (such as a round-robin allocation or a least recently used algorithm) could also be employed to advantage in the present system. Greater detail on the structure and function of the processing units 110 in particular and the processing system in general can be found in the NPU patent referenced above. Interposed between the dispatcher 112 and the plurality of processing units 110 is a hardware classifier assist 118 which is described in greater detail in a concurrently-filed patent application entitled "Method and System for Frame and Protocol Classification" by Jean L. Calvignac et al., Ser. No. 09/479,027 filed Jan. 7, 2000, a patent which is hereby specifically incorporated herein by reference.

As a result of processing by one of the plurality of processing units 110, a completed or processed information unit is created from the input information unit which was originally received by the one processing unit. That processed information unit is placed into one of the two data stores, the UP data store 16a or a down data store 34a. The completion unit 114 also places an identifier related to the processed information unit into the associated enqueue (either the up enqueue 16 or the down enqueue 34).

Figure 3:
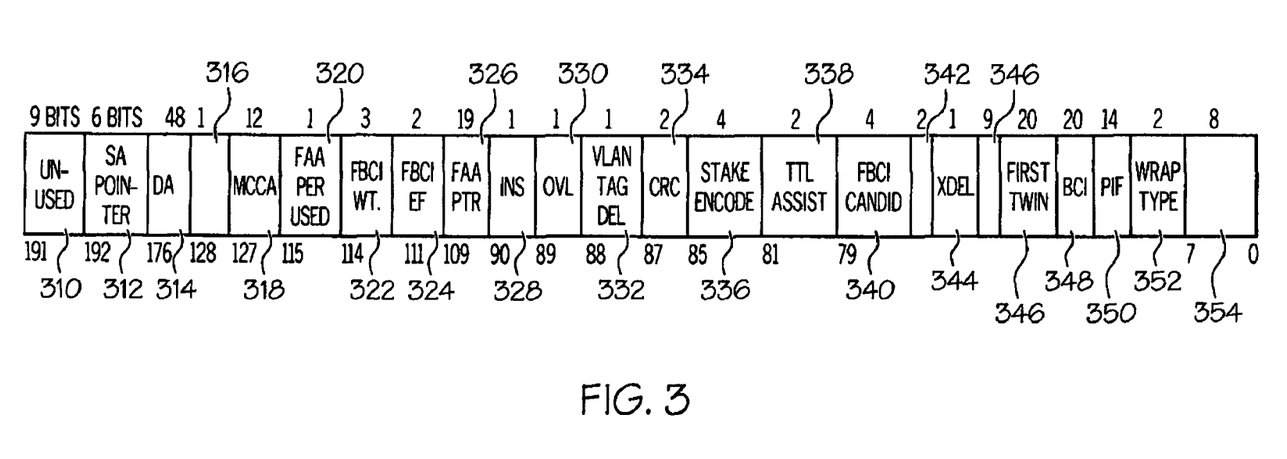
FIG. 3 is a diagram of a port control block (PCB) page used to define the frame alterations which are to be implemented on an associated frame of data, including flexible frame alteration commands.

FIG. 3 illustrates the format of a control page associated with each frame and which indicates the desired frame alterations to be made. The control page is sometimes referred to as a port control block page and the content of the control page and the order of elements included therein are matters subject to design choice according to the requirements of the system and the preferences of the designer. As shown in this figure, the page includes 192 bits labeled from 191 down to 0 and arranged in the form of several field of varying length. The first 9 bits are field 310 which is not used for frame alteration. The next 6 bits (bits 182 to 177) are a field 312 as a pointer to the source address (SA Ptr) for the frame, followed by field 314, the destination address (DA) of 48 bits (bits 176 to 129). The next field 316 is a bit, one of several fields (like fields 342, 346 and 354) which are reserved and not currently used for frame alteration, although they could be used to accommodate additional frame alteration function in the future, if desired. The next field 318 of 12 bits (bits 127 to 116) are used for the MCCA function, a function which is not used in frame alteration but is useful in determining how and when to release data buffers.

Figure 4:
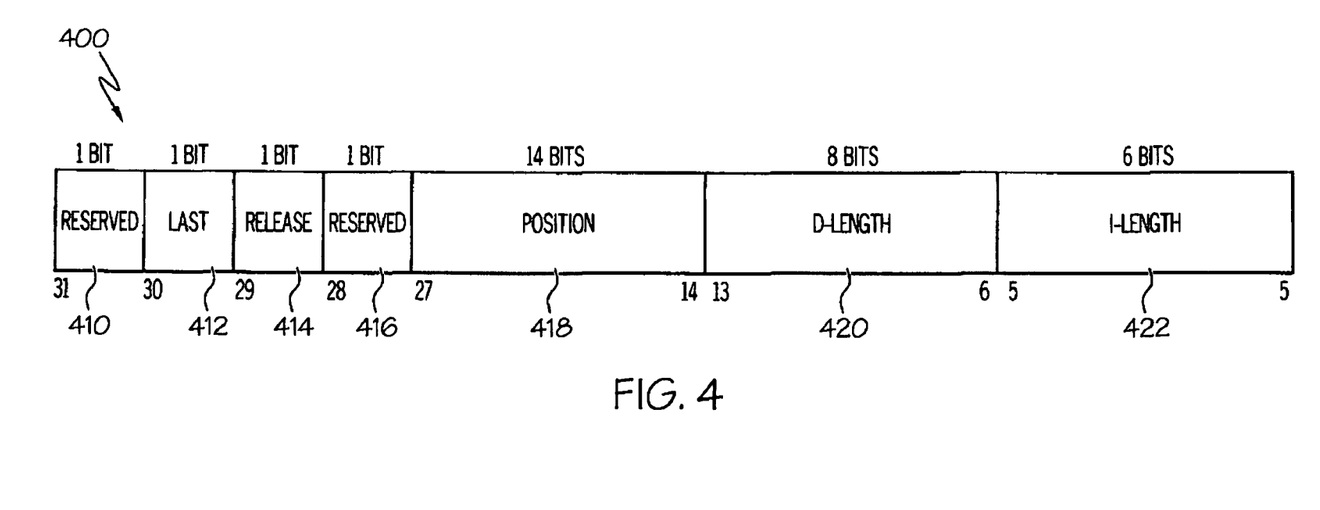
FIG. 4 illustrates the format of flexible frame alteration commands.

Following the MCCA field 318 is bit 115 which is a one bit field 320 entitled FAA pointer to indicate whether flexible frame alterations using the format described in connection with FIG. 4 are being used for this frame. If the FAA pointer is 0, then no flexible frame alterations are used for the frame; if it is 1, then flexible frame alterations apply to the frame. Next are two fields (fields 322,324) related to the details of the flexible frame alteration or its acronym FBCI, a three bits field for its weight and an "FBCI.ef" field of 2 bits. The FBCI fields 322, 324 relate to flexible frame alterations as follows: The weight field 322 indicates if there are one or two cell buffers of flexible frame alterations for the frame. Each cell contains 64 bytes, arranged into 16 words. The first word (word0) of each cell is reserved and not used in the flexible frame alterations of the present invention. The remainder of the cell (word1 through word15) are packed with frame alteration commands, packed from the bottom up, so that if there are ten words for commands and insert data for a given frame and its associated cell, then the first word used for such commands in the cell would be word6 (e.g., the ten words would be in word6 through word15, with word15 being the last and word6 being the first. FIG. 4 illustrates the format of one of the alteration commands and explains the format of the commands for frame alterations. The next field 326 of nineteen bits is the starting address for the flexible frame alteration commands. This field 326 is also split into two separate fields when the Ethernet Type field is to be inserted or overlaid with the DA and the SA. If the ETYPE field is to be included in the DA/SA overlay or insert, no flexible FAA commands are permitted, and the FAA Ptr Used field 320 must be set too. Bits 18–16 (field 326) are used as the ETYPE action. When these bits are "001", the ETYPE is included in the DA/SA insert or overlay. Bits 15–0 of field 326 then contain the 16 bit ETYPE value to be used in the insert or overlay.

Following these flexible frame alteration fields 322, 324, 326 are two fields 328, 330 indicating whether the destination address and source address are to be inserted (INS at bit 90) or overlaid (OVL at bit 89), which are mutually exclusive in that if the source and destination address are to be inserted, these field will not be overlaid (and vice versa), although neither could be set, indicating no change to the SA and DA fields of the message. Then comes VLAN field 332 (bit 88) which indicates whether a virtual local area network indicator or tag is to be deleted from the frame. At bits 87–86, CRC field 334 indicates whether a new CRC is to be determined and used in the frame. Bits 85–82 comprise field 336 which relate to stake encode and indicate the offset into the frame where the headers for Ethernet IPv4 version or Ethernet IPx version begin, a variable distance of from 0 bytes to 34 bytes. The offsets for the beginning of the frame are stored in a table and retrieved based on the content of this field. Once the offset for the frame is known, then other key pieces of data such as the TC field for hop count in the Ethernet IPx version (which is offset 4 into the header of the Ethernet IPx frame) and for time to live (known as TTL) information in the Ethernet IPv4 version (which is offset 8 in the header of the Ethernet IPv4 version header) can be located within the frame.

The next field 338 (bits 81–80) is a TTL assist field, indicating whether the TTL field (for IPv4) or the transport control TC field (for IPx) is to be modified by the frame alteration system. The choices are no action (00 in this field), decrement the TTL (01 in this field, which means that the TTL is to be decremented in the stake plus 8 location), increment the hop count field (10 in this field, which means that the transport control field TC in the frame is to be incremented for Ethernet IPx at stake plus 4). Since a frame may be either Ethernet IPx or Ethernet IPv4 (but not both), this TTL field may not be 11 (which would indicate that the TC field would be both incremented and decremented at the same time). And, since any change of the TTL alters the IPv4 header checksum, it is necessary to update this checksum along with altering the TTL field. In addition, since the frame as a whole has been altered, the CRC at the end of the frame will also have to be recalculated as well.

The next field 340 (bits 79–76) is also related to the FBCI, a field which is known as FBCI.CMDID. This is a pointer to the word in the first cell which contains the first of the flexible frame alteration commands, and the format for these flexible frame alteration commands are described in connection with FIG. 4.

Located between two reserved fields—a two-bit field 342 (at bits 75–74) and a nine-bit reserved field 346 (bits 72–64)—both of which fields are not related to the present system of frame alteration is a one-bit field 344 (bit 73) for XDEL, indicating whether or not when an excessive amount of frame deletion occurs, the buffer is to wait for more data for the frame before transmitting the frame.

Next are two 20 bit fields 346, 348, one for "first twin" and the other for BCI, at bits 63–44 and 43–24, followed by a 14-bit field 350 for PIF (bits 23–10) and a two-bit field 352 (bits 9 and 8) for wrap type. The PCB Page then concludes with an 8-bit field 354 which is reserved for functions not associated with the frame alterations which are discussed herein.

FIG. 4 illustrates the format for a flexible frame modification instruction word 400 which is used in the present invention. Each flexible frame alteration command or instruction word 400 includes 32 bits, broken into 5 substantive fields (fields 412, 414, 418, 420, 422) and two reserved fields (fields 410, 416, corresponding to bit 31 and 28, respectively) which are not associated with the present frame alterations. Bit 30 (or field 412) is a field which indicates whether this is the last flexible frame alteration for a given frame. If it is 1, then this is the last flexible frame modification. The next field 414 (bit 29) indicates—by a 1—that the entire frame alteration buffer should be released when the frame alteration is completed—that is, that the frame alterations specified are for one-time use. (Since this applies to the entire buffer which may include multiple commands, each command must specify the release if the buffer is to be released upon completion of the specified frame alterations.) If the same set of frame alterations apply to other frames, it is not released and this is known as a static alteration, one which is used for multiple frames. If this is not a static alteration, then it is erased after the frame alteration is accomplished and the storage space is reused. The frame alterations are stored in off-chip data stores, which are large enough for the frame alterations but which are kept to a manageable size by reusing those frame alteration storage spaces which are not needed. One technique for frame alteration sets the release bit to 1 for each frame, insuring that the space is released after the frame alteration is accomplished, but this technique then does not allow for the savings in set up time for reuse of a given frame alteration command.

The next substantive field 418 (bits 27–14) is used for position information. It contains the location relative to the original frame as sent to the PMM by the Egress EDS, before any alterations are done. Following this field is the field 420 of 8 bits (bits 14–6) indicating D-Len, the length of a delete in bytes, followed by six bits (bits 5–0) of I-Len indicating the number of bytes to insert. Since insert data cannot cross FAA buffer boundaries, if the length of the insert data goes into the next buffer, it must be split into two adjacent insert commands.

It is possible for each of the D-Len and the I-Len fields to be either zero or non-zero, and both fields can exist in a single command. If D-Len is zero and I-Len is not zero, then this command indicates the number of bytes to be inserted and the command represents an insertion. If D-Len is non-zero and I-Len is zero, then this command is a deletion of the specified number of bytes. If both are zero, then the command represents a do nothing command. When both D-Len and I-Len are non-zero, then the command represents a simultaneous deletion and insertion sometimes referred to as a compound delete/insert.

Figure 5:
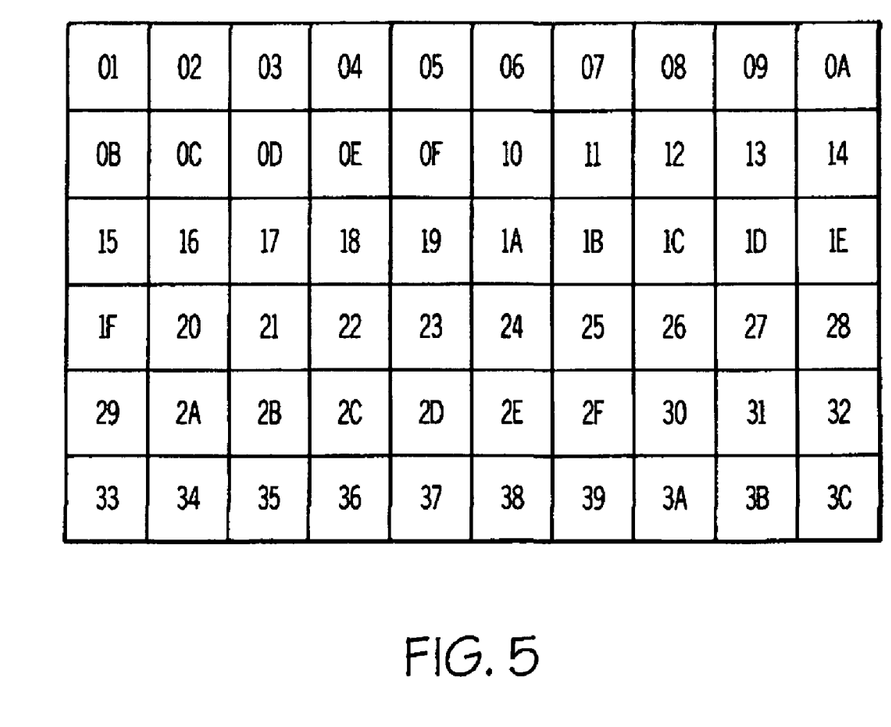
FIG. 5 is a diagram of an illustrative frame of data (or input information unit), before alterations are made as described in the text.

FIG. 5 represents a typical input information unit, a frame of data which is to be altered according to a stored frame alteration. A frame of 60 bits arranged into 6 rows has been shown here, filled with consecutive hexadecimal numbers in consecutive frames. That is, the frame includes cells from 01 through 0F, then 10 through 1F, 20 through 2F and 30 through 3C. The frame has the following characteristics: The destination address. (DA)/source address (SA) are to be overlaid, with no etype, with the 6-byte destination address (DA) being D1 D2 D3 D4 D5 D6 and the source address pointer (SA PTR) being 8, which corresponds to a source address (which is obtained from the SA buffer) of B1 B2 B3 B4 B5 B6. The VLAN tag is to be deleted, the TTL is IPx increment and the stake encode is set to 0111 (24 bytes). The FAA pointer is used (=1), the FBCI.CMDID=2, the FBCI.WT=1, and the flexible frame alteration commands are insert 2 bytes (A1 A2) at frame location 30, delete 3 bytes at frame location 36, delete 4 bytes/insert 8 bytes (A3 A4 A5 A6 A7 A8 A9 AA) at frame location 50.

The foregoing set of frame alteration instructions has the following FAA buffer, with each command and its location in the FAA buffer:

1. insert command (with location at 30) (in word 2)
2. insert data (A1 A2) (in word 3)
3. delete command (with location at 36 and amount of 3 bytes) (in word 4)
4. compound delete/insert command (with location 50 and 4 byte amount of delete) (in word 5)
5. insert data (A3 A4 A5 A6) (in word 6)
6. insert data (A7 A8 A9 AA) (in word 7)

Figure 6:
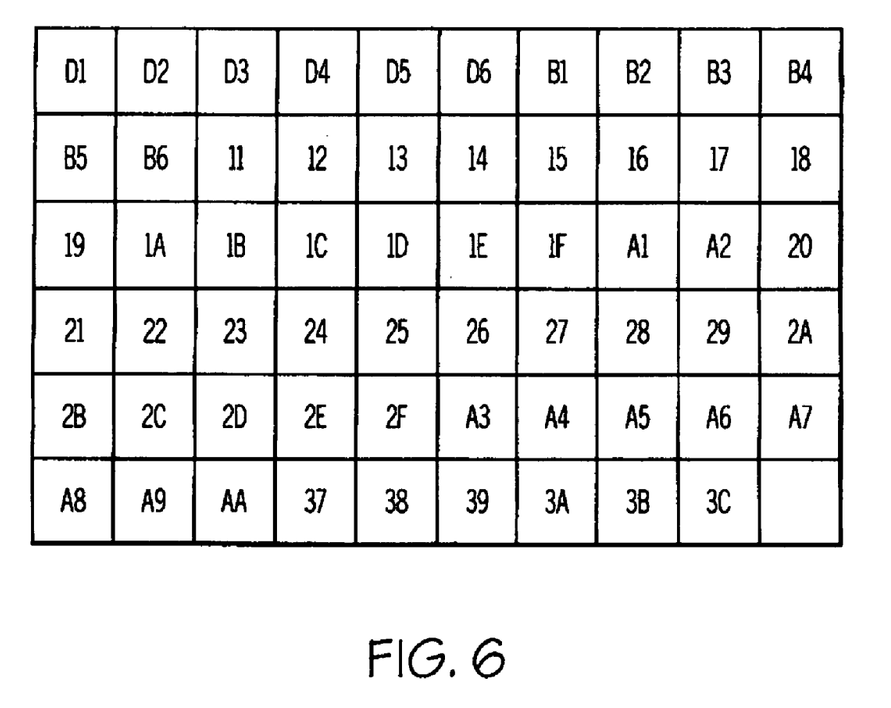
FIG. 6 is a diagram of an output information unit, the illustrative frame of data shown in FIG. 5 after frame alterations have been made by the system of the present invention as described in the text.

FIG. 6 represents the frame of FIG. 5 altered as a result of the stored frame alteration. This frame is therefor a completed frame alteration, sometimes referred to as an output information unit. The frame includes the destination address (D1 D2 D3 D4 D5 D6) overlaid as the first six bytes, followed by the source address (B1 B2 B3 B4 B5 B6) as the next six bytes of the frame, replacing the first 11 bytes of the frame which included the destination address and the source address pointer in FIG. 5. The original 13th through the 16th byte (which were 0D through 10 in FIG. 5) have been deleted due to the VLAN Tag delete command, bytes A1 and A2 were added (or inserted) after byte 30. After byte 29, the effect of the deletion and insertion is that bytes A3 A4 A5 A6 A7 A8 A9 and AA appear, then the original sequence picks back up with 37 through 3C. Note that the output is one byte shorter than the original data, although the output could be either longer or shorter than the input, as a result of deletions and insertions of variable length.

Figure 7:
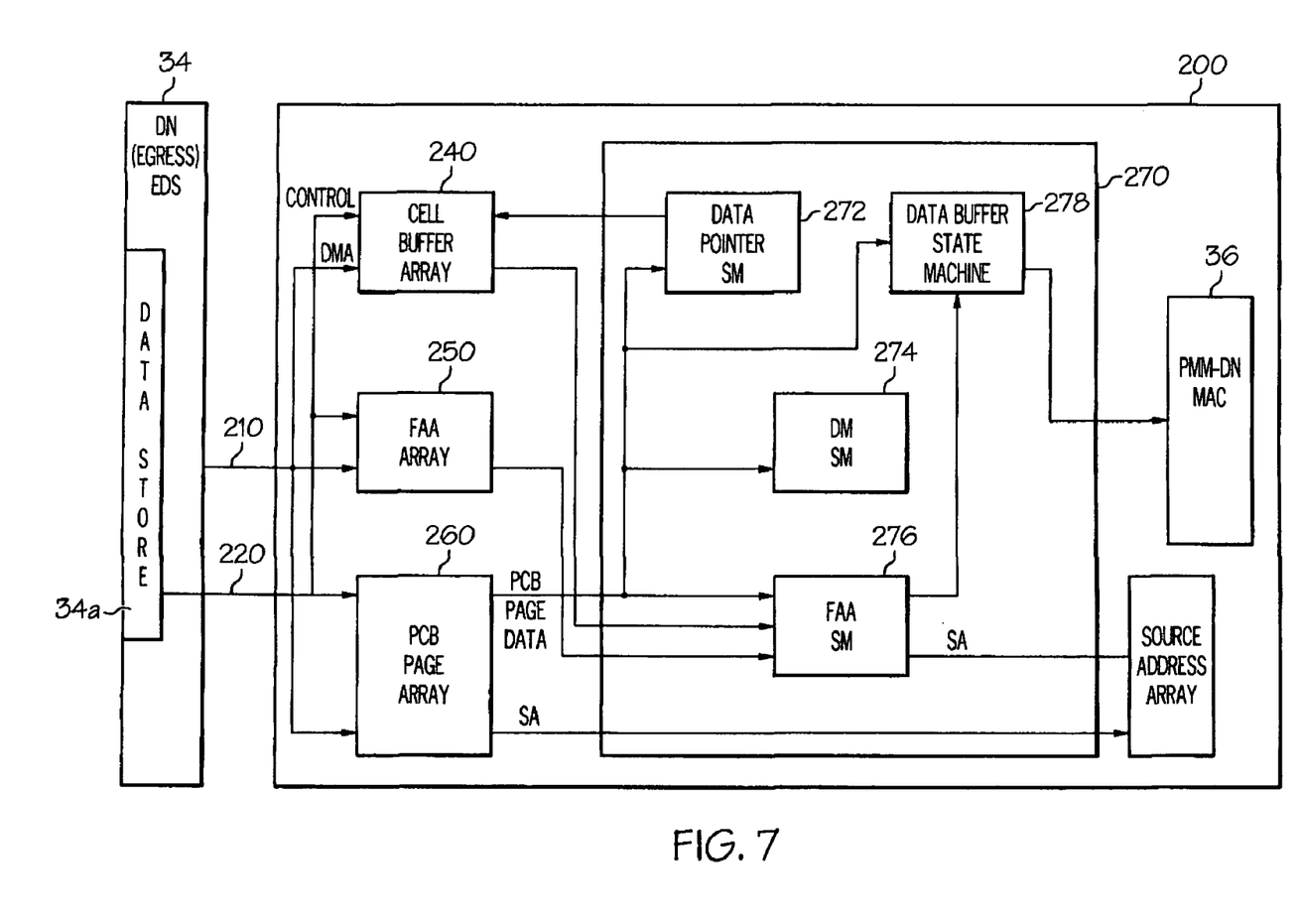
FIG. 7 is a block diagram of a portion of the alteration unit of the present invention to illustrate the frame alteration techniques of the present invention.

FIG. 7 represents a view of some of the elements involved with the frame alteration of the present invention. In particular, the down enqueue-dequeue-scheduler 34 (DN EDS), which is also sometimes referred to as the egress EDS, is coupled to the down data store (DN DS) 34a and is also coupled to the egress or down PMM MAC 36 through the use of control lines 210 and data lines 220. The egress PMM 200 includes a cell buffer array 240, a frame alteration array (FAA) 250 and a PCB Page buffer 260. A data mover module 270 is coupled to the cell buffer array 240, the frame alteration array 250 and the PCB Page buffer 260. The data mover module 270 includes a data pointer state machine 272, a data mover state machine 274 and a FAA state machine 276 as well as a data buffer state machine 278. The output of the data mover 270 is coupled to the MAC's 36 leading out of the chip and into the network, in other words, into the physical layer of the network.

The various state machines are designed as logic (hardware elements) to go through various steps, in response to system inputs, to conduct logical operations analogous to software functions. These state machines are well known in the art and progress through different states (such as prestart, start, start2, etc.) as signals arrive and calculate the necessary modifications to the data content and pass the modified data along to the next function.

The creation of hardware to accomplish the frame alteration may be accomplished in a variety of ways, including designing specific, discrete logic to accomplish the desired alterations. However, in light of current design tools and manufacturing techniques, it is more common to specify the specific tests and changes using a design tool such as VHDL and then to use software and manufacturing techniques to accomplish the design in a semiconductor.

Of course, many modifications to the present invention will be apparent to those skilled in the relevant art in view of the foregoing description of the preferred embodiment, taken together with the accompanying drawings. For example, which frame alterations functions are to be done at all, and which are considered "common" and subject to hardware implementations and which routines are implemented through the use of software, are somewhat matters of design choice for the system designer. The hardware to implement the frame alterations depend also on the requirements of the alterations and the priorities of the designer, with the selection of implementing hardware allowing for many substitutions and adaptations. While frame alteration has been disclosed in connection with an output being transferred out toward a network, frame alteration may be useful in other portions of a processing system such as the input side, processing data in from a network. Additionally, the software programming format as described in connection with the preferred embodiment is subject to many modifications, including the language in which the programming is implemented and the use of the various programming techniques which the chosen language provides. Some of the features of the present invention made be employed to advantage without the corresponding use of others. Accordingly, many modifications of the preferred embodiment can be made without departing from the spirit of the present invention. Thus, the foregoing description of the preferred embodiment should be considered as merely illustrative of the principles of the present invention and not in limitation thereof.

The invention claimed is:

1. A system for altering an information unit in a network processing system, the system comprising:
   a substrate including a plurality of processors carried thereon, said processors for receiving input information units from the network and preparing processed information units for transmission to the network;
   a dispatcher carried on the substrate and coupled to the plurality of processors for receiving input information units from the network, determining availability of at least one of the plurality of processors to process information units and transmitting at least one of the information units for processing to the at least one of the plurality of processors;
   a completion unit carried on the substrate and coupled to the plurality of processors, said completion unit receiving a processed information from the plurality of processors and for communicating the processed information units to the network in the same order in which said units were received; and
   a subassembly carried on the substrate for making selective alterations to the information units, said subassembly coupled to the completion unit and the network for modifying the information units and including:
      a control word associated with each frame to be altered containing an indicator for each of the desired alterations;
      hardware devices to identify some alterations as fixed to the frame of data and to alter said some alterations in accordance with a fixed alteration resulting from the hardware devices; and
      software programming including stored algorithms to identify other alterations as variable alterations and to alter such other alterations on the information unit.

2. A system for altering information units including the elements set forth in claim 1 wherein the system for modifying the information unit includes a system for identifying bits to be added or deleted from an information unit and includes a stored programming to accomplish the alteration to the information unit.

3. A system for altering information units of the type described in claim 1 wherein the system further includes a device for changing a counter in the information unit.

4. A system for altering information units of the type described in claim 1 wherein the system further includes a system for determining a revised integrity token for a revised information unit and the system for making alterations includes a module for replacing an integrity token associated with the information unit with the revised integrity token associated with the revised information unit.

5. A system of the type described in claim 1 wherein the system further includes a system for altering a portion of the information unit which is based on a feature of the information unit.

6. A system for altering frames of the type described in claim 1
   and further including
   an instruction associated with the input information unit for defining variable frame alterations.

7. A method of altering a frame of data comprising:
   providing a list of permitted frame alterations some of said frame alterations being fixed and others being variable;
   identifying some of the listed frame alterations as fixed alterations and implementing the some alternations in hardware designed to accomplish those frame alterations;
   identifying others of the listed frame alterations as variable alterations and implementing the variable alterations in stored program instructions to accomplish those other frame alterations;
   for each frame, receiving a list of the alterations appropriate for that frame;
   accomplishing the listed alterations which are identified as fixed alterations in hardware and the frame alterations which are identified as variable alterations by executing the stored program instructions.

8. A method of altering an information unit according to claim 7 and further including calculating a revised check value for an altered information unit and transmitting the revised check value with the altered information unit.

9. A system for altering a frame of information as the frame of information is being passed from one element to another element in a processing system, the frame altering system comprising:
   logic for interpreting an instruction defining a frame alteration for determining whether the frame alteration is a fixed alteration or a variable alteration;
   hardware associated with the logic for performing a fixed alteration on the frame of information if a fixed alteration is determined;

a processor associated with the logic for receiving the frame and for receiving stored instructions relating to the variable alteration if a variable alteration is determined, whereby the processor uses the stored instructions to perform the variable alteration on the frame if the frame alteration is a variable alteration; and an output for passing the altered frame to the next element.

10. A system for altering an information unit comprising:

a plurality of processors, formed on a substrate, for receiving information units and preparing processed information units;

a dispatcher, formed on said substrate and coupled to the plurality of processors, to receive input information units, to determine availability of at least one of the plurality of processors to process information units and to transmit at least one of said input information units for processing to a selected one of said processors;

a completion unit, formed on the substrate, coupled to the plurality of processors, to receive and to transmit processed information units in the same order in which said information units were received; and a system, formed on the substrate, to make alterations to the information units operatively coupled to said completion unit, wherein said system includes hardware devices that perform fixed alterations on selected portions of information units and software that performs variable alterations on selected portions of said information units.

11. A method of altering a frame of data comprising:

providing a list of permitted frame alterations, some of said frame alterations being fixed and others being variable;

receiving the frame of data;

identifying portion of said frame as fixed alterations;

identifying portion of said frame as variable alterations;

using hardware to alter the portion of the frame identified as fixed alterations; and using software to alter the portion of the frame identified as variable alterations.

* * * * *